United States Patent [19]
Willis, Jr. et al.

[11] 3,907,914
[45] Sept. 23, 1975

[54] ISOMERIZATION OF AROMATIC HYDROCARBONS

[75] Inventors: James L. Willis, Jr.; Philip Grandio, Jr., both of Beaumont, Tex.

[73] Assignee: Mobil Oil Corporation, New York, N.Y.

[22] Filed: July 17, 1973

[21] Appl. No.: 380,057

Related U.S. Application Data

[63] Continuation of Ser. No. 133,571, April 13, 1971, abandoned.

[52] U.S. Cl. .......................... 260/668 A; 260/672 T
[51] Int. Cl. ............................................. C07c 5/24
[58] Field of Search ...................... 260/668 A, 672 T

[56] References Cited
UNITED STATES PATENTS

| | | | |
|---|---|---|---|
| 3,548,017 | 12/1970 | Hebert et al. | 260/668 A |
| 3,578,723 | 5/1971 | Bowes et al. | 260/668 A |
| 3,637,880 | 1/1972 | Burress | 260/668 A |

OTHER PUBLICATIONS

Allen et al., Jacs; 81, pp. 5289–5292 Oct. 20, 1959.

Atkins, Hydrocarbon Processing; Nov. 1970 pp. 127–136.

*Primary Examiner*—C. Davis
*Attorney, Agent, or Firm*—C. A. Huggett

[57] ABSTRACT

Alkyl aromatic hydrocarbons are isomerized in the presence of an aromatic diluent and a crystalline aluminosilicate catalyst.

3 Claims, 4 Drawing Figures

INVENTORS
PHILIP GRANDIO, JR.
JAMES L. WILLIS, JR.

By

O G Hayes
ATTORNEY

ISOMERIZATION OF AROMATIC HYDROCARBONS

This is a continuation of application Ser. No. 133,571, filed Apr. 13, 1971, and now abandoned.

BACKGROUND OF THE INVENTION

1. Field of the Invention

The present invention relates to the use of an aromatic diluent to achieve selectivity in the isomerization of alkyl aromatic hydrocarbons in the presence of a crystalline aluminosilicate catalyst.

2. Description of the Prior Art

The catalytic rearrangement of alkyl groups present in alkyl aromatic hydrocarbons to provide one or more products suitable for use in the petroleum and chemical industries has heretofore been effected by a wide variety of catalysts. Acidic halides such as aluminum chloride, aluminum bromide, boron trifluoride — hydrogen fluoride mixtures, etc. have been used in the rearrangement of alkyl benzenes to provide valuable intermediates which find utility in the synthesis of rubber, plastic, fibers and dyes. Other catalysts which have been used include solid siliceous cracking-type catalysts such as silica-alumina and clays and platinum deposited on silica-alumina. Although various catalysts possess one or more desired characteristics, a majority of catalysts heretofore employed suffer from several disadvantages. Acidic halides such as aluminum chloride, for example, are partially soluble in the feed material and are easily lost from the catalyst zone. Catalysts of this type are also uneconomical because of their extreme corrosiveness and requirement for recovery from the effluent products. Other catalysts of the heterogeneous type, such as silica-alumina, platinum on alumina, etc., do not possess sufficient acidity to provide effective conversion and necessitate the use of relatively high temperatures above the order of 800°F. to 950°F. High temperatures frequently lead to coke formation whic lowers the yield of desired product and necessitates frequent regeneration of the catalyst to remove coke. This results in reducing on-stream time and leads to high catalyst consumption due to loss of catalyst activity. Heterogeneous catalyst such as the crystalline aluminosilicates, both natural and synthetic, possess sufficient acidity but suffer the disadvantage or poor selectivity and aging as evidenced by "coke" make and the excessive amounts of disoproportionated products formed in isomerization reactions.

SUMMARY

The invention relates to the use of 5 to 30% by weight, preferably 15 to 25% by weight, of an aromatic hydrocarbon as a diluent to increase selectivity in the isomerization of alkyl aromatic hydrocarbons. The isomerization reaction is carried out in the presence of a crystalline aluminosilicate catalyst which has a pore size of greater than 5 Angstrom units such as zeolites X, Y, mordenite, beta and ZSM-4. Because members of the family of zeolites designated as ZSM-4 possess extraordinary selectivity, such materials are especially preferred.

PREFERRED EMBODIMENT

The starting feed materials for isomerization to be employed in the process of the invention are preferably single ring aromatic hydrocarbons containing a minimum of two and a maximum of four alkyl group substituents on the ring. These feed materials may be illustrated by the following structural formula:

wherein R is a lower alkyl group, straight or branch chained, having 1 to about 4 carbon atoms and n is an integer of 2 to 4. Thus, it is to be understood that the ring may contain from 2 to 4 alkyl substituents. Lower alkyl groups for R include especially methyl, ethyl, n-propyl, n-butyl, isopropyl or isobutyl or any combination thereof.

Specific compounds following within the above structural formula include para-Xylene, meta-Xylene, ortho-Xylene, mesitylene (1, 3, 5-trimethylbenzene), durene (1, 2, 4, 5-tetramethylbenzene), hemimellitene (1, 2, 3-trimethylbenzene), pseudocumene (1, 2, 4-trimethylbenzene), prehnitene (1, 2, 3, 4-tetramethylbenzene), isodurene (1, 2, 3, 5-tetramethylbenzene), and 1, 3, 5-triethylbenzene.

Of the above listing of specific feed materials which may be used, the xylene isomers and pseudocumene are especially preferred.

The diluent material employed in the process of the invention is an aromatic hydrocarbon preferably containing alkyl substituents. In a preferred embodiment the diluent material contains one less ring substituent than the feed material. Thus, the preferred diluent material may be described by the following structural formula:

wherein R and $n$ are as defined above with respect to the feed material. Set forth herein below is a listing of the most preferred aromatic feed starting materials and the diluents which should be used therewith.

| Feed | Diluent |
| --- | --- |
| P-Xylene | Toluene |
| m-Xylene | Toluene |
| o-Xylene | Toluene |
| Pseudocumene | m-Xylene |
| Hemimellitene | m-Xylene |
| Mesitylene | m-Xylene |
| Prehnitene | Mesitylene |
| Durene | Pseudocumene |

Other diluents may include, cumene (isopropylbenzene), para-cumene (4-isopropyltoluene), pentamethylbenzene (1, 2, 3, 4, 5-pentamethylbenzene), hexamethylbenzene, ethylbenzene, normal-propylbenzene, normal-butylbenzene, hexaethylbenzene and benzene.

The amount of aromatic diluent is not narrowly critical and will vary within the range of 5 to 30 weight percent based on the feed material undergoing isomerization. Preferably the amount of diluent is within the range of 15 to 25 weight percent.

The preferred crystalline aluminosilicates used for purposes of the invention are designated as "Zeolite ZSM-4" or simply "ZSM-4". ZSM-4 compositions can be identified in terms of mole ratios of oxides as follows:

$$0.9 \pm 0.2\ M_{2/n}O : W_2O_3 : 3-20\ YO_2 : zH_2O$$

wherein M is a cation, $n$ is the valence of said cation, W is selected from the group consisting of aluminum and gallium, Y is selected from the group consisting of silicon and germanium, and $z$ is from 0 to 20. In the as synthesized from the zeolite has a formula, in terms of mole ratios of oxides as follows:

$$0.9 \pm 0.2\ M_{2/n}O : Al_2O_3 : 3-20\ SiO_2 : zH_2O$$

and M is selected from the group consisting of a mixture of tetramethylammonium cations and alkali metal cations, especially sodium. The original cations can be present so that the amount of tetramethylammonium cations is between 1 and 50 percent of the total amount of the original cations. Thus, the zeolite can be expressed by the following formula, in terms of mole ratios of oxides:

$$0.9 \pm 0.2\ [xR_2O + (1-x)M_{2/n}O]: W_2O_3 : 3-20\ YO_2 : 0-20\ H_2O$$

where W and Y have the previously assigned significance, R is tetramethylammonium, M is an alkali metal cation and $x$ is between 0.01 and 0.50.

The original cations can be replaced, at least in part, by ion exchange with another cation. Preferably, the other cation is selected from the group consisting of alkylammonium e.g. tetramethylammonium, arylammonium, metals, ammonium, hydrogen, thermally treated products of ammonium and/or hydrogen, or combinations of any of these cations. Particularly, preferred cations include hydrogen, rare earth metals, aluminum metals of groups II and VIII of the Periodic Table and manganese. Also desired are zeolites which are thermally treated products of the ammonium hydrogen, arylammonium and/or alkylammonium cationic forms, said thermal treatment consisting of heating the zeolite in the particular cation form at a temperature of at least about 700°F. In a preferred embodiment of ZSM-4, W is aluminum, Y is silicon and the silica/alumina mole ratio is at least 5 and ranges up to about 15.

Members of the family of ZSM-4 zeolites possess a definite distinguishing crystalline structure whose X-ray diffraction pattern has the following values:

Table 1

| Interplanar Spacing d(A) | | | Relative Intensity |
|---|---|---|---|
| 9.1 | ± | .2 | vs |
| 7.94 | ± | .1 | mw |
| 6.90 | ± | .1 | m |
| 5.97 | ± | .07 | s |
| 5.50 | ± | .05 | mw |
| 5.27 | ± | .05 | mw |
| 4.71 | ± | .05 | mw |
| 4.39 | ± | .05 | w |
| 3.96 | ± | .05 | w |
| 3.80 | ± | .05 | s |
| 3.71 | ± | .05 | m |
| 3.63 | ± | .05 | m |
| 3.52 | ± | .05 | s |
| 3.44 | ± | .05 | m |
| 3.16 | ± | .05 | s |
| 3.09 | ± | .05 | m |
| 3.04 | ± | .05 | m |
| 2.98 | ± | .05 | m |
| 2.92 | ± | .05 | s |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and $d$ (obs.), the interplanar spacing in A., corresponding to the recorded lines, were calculated. In Table 1 the relative intensities are given in terms of the symbols $s$ = strong, $m$ = medium $ms$ = medium strong, $mw$ = medium weak and $vs$ = very strong. It should be understood that this X-ray diffraction pattern is characteristic of all the species of ZSM-4 compositions. Ion exchange of the sodium ion with another cation reveals substantially the same pattern with some minor shifts in interplanar spacing and variation in relative intensity. Various cation exchanged forms of ZSM-4 have been prepared. X-ray power diffraction patterns of several of these forms are set forth below. The ZSM-4 forms set forth below are all aluminosilicates.

| NaTMAZSM-4 | | NaTMAZSM-4 | | HZSM-4 | | ZnNaTMAZSM-4 | |
|---|---|---|---|---|---|---|---|
| d(A°) | I/I₀ | d(A°) | I/I₀ | d(A°) | I/I₀ | d(A°) | I/I₀ |
| 17.5 | 2 | 17.6 | 5 | | | | |
| 16.0 | 17 | 16.1 | 20 | 15.8 | 12 | 16.1 | 6 |
| 9.18 | 100 | 9.19 | 100 | 9.12 | 100 | 9.21 | 79 |
| 7.96 | 21 | 7.96 | 20 | 7.88 | 49 | 7.97 | 40 |
| | | 7.34 | 3 | | | | |
| 6.94 | 12 | 6.93 | 30 | 6.85 | 24 | 6.92 | 36 |
| 6.01 | 34 | 6.01 | 33 | 5.95 | 62 | 6.01 | 60 |
| 5.53 | 4 | 5.53 | 7 | 5.47 | 10 | 5.53 | 6 |
| 5.29 | 8 | 5.29 | 7 | 5.25 | 10 | 5.29 | 15 |
| 4.73 | 30 | 4.72 | 31 | 4.69 | 19 | 4.73 | 51 |
| | | | | 4.54 | 7 | | |
| 4.41 | 4 | 4.39 | 4 | 4.37 | 23 | 4.40 | 9 |
| 4.12 | 5 | 4.19 | 1 | | | | |
| 3.97 | 13 | 3.95 | 11 | 3.94 | 20 | 3.97 | 18 |
| 3.82 | 67 | 3.81 | 69 | 3.78 | 52 | 3.82 | 100 |
| 3.74 | 14 | 3.72 | 28 | 3.69 | 14 | 3.72 | 36 |
| 3.64 | 31 | 3.63 | 26 | 3.61 | 13 | 3.64 | 24 |
| 3.54 | 30 | 3.53 | 54 | 3.50 | 28 | 3.53 | 72 |
| 3.46 | 7 | 3.45 | 14 | 3.42 | 12 | 3.45 | 15 |
| 3.28 | 4 | 3.28 | 5 | | | | |
| 3.17 | 23 | 3.16 | 48 | 3.15 | 43 | 3.17 | 60 |

-Continued

| NaTMAZSM—4 | | NaTMAZSM—4 | | HZSM—4 | | ZnNaTMAZSM—4 | |
|---|---|---|---|---|---|---|---|
| d(A°) | I/I₀ | d(A°) | I/I₀ | d(A°) | I/I₀ | d(A°) | I/I₀ |
| 3.10 | 12 | 3.10 | 23 | 3.07 | 14 | 3.10 | 27 |
| 3.05 | 25 | 3.04 | 21 | 3.03 | 20 | 3.05 | 27 |
| 2.99 | 14 | 2.99 | 13 | 2.97 | 10 | 3.00 | 18 |
| 2.93 | 43 | 2.92 | 48 | 2.91 | 29 | | |
| 2.83 | 4 | 2.83 | | 2.81 | 1 | | |
| 2.775 | 1 | | | 2.77 | 1 | | |
| 2.67 | 3 | 2.67 | 2 | | | 2.66 | 9 |
| 2.65 | 6 | 2.65 | 3 | 2.64 | 7 | 2.64 | 8 |
| 2.63 | 5 | 2.63 | 3 | 2.61 | 3 | 2.57 | 2 |
| 2.56 | 1 | 2.55 | 2 | 2.55 | 1 | 2.53 | 8 |
| 2.52 | 6 | 2.52 | 3 | 2.52 | 5 | 2.51 | 2 |
| 2.49 | 4 | 2.48 | 2 | 2.49 | 2 | 2.48 | 1 |
| 2.43 | 1 | 2.41 | 1 | 2.42 | 1 | 2.42 | 2 |
| 2.40 | 3 | 2.395 | 2 | 2.39 | 1 | 2.39 | 6 |
| 2.38 | 5 | 2.37 | 2 | 2.36 | 2 | 2.35 | 1 |
| 2.34 | 1 | 2.30 | 1 | | | 2.29 | 4 |
| 2.28 | 7 | 2.27 | 2 | 2.27 | 3 | 2.265 | 2 |
| 2.19 | 2 | | | 2.18 | 2 | 2.17 | 4 |
| 2.17 | 1 | | | 2.15 | 2 | 2.145 | 3 |
| 2.14 | 3 | 2.14 | 2 | 2.125 | 3 | 2.115 | 3 |
| 2.10 | 4 | 2.10 | 2 | 2.10 | 3 | 2.10 | 2 |
| 2.09 | 2 | 2.08 | 1 | 2.07 | 1 | 2.06 | 3 |
| 2.04 | 1 | 2.03 | 1 | 2.02 | 2 | 2.015 | 1 |
| 2.02 | 3 | 2.015 | 1 | 2.01 | 2 | 2.00 | 6 |
| 1.99 | 6 | 1.98 | 4 | 1.98 | 3 | 1.97 | 6 |

| RENaZSM—4 | | CaNaTMAZSM—4 | | MgNaTMAZSM—4 | |
|---|---|---|---|---|---|
| d(A°) | I/I₀ | d(A°) | I/I₀ | d(A°) | I/I₀ |
| | | 17.5 | 8 | | |
| | | 15.8 | 38 | 16.1 | 17 |
| 9.12 | 87 | 9.10 | 100 | 9.07 | 100 |
| 7.93 | 8 | 7.90 | 11 | 7.93 | 28 |
| 6.89 | 42 | 6.88 | 43 | 6.89 | 36 |
| 5.97 | 71 | 5.96 | 55 | 5.98 | 64 |
| 5.49 | 5 | 5.49 | 13 | 5.50 | 7 |
| 5.27 | 10 | 5.26 | 10 | 5.29 | 17 |
| 4.79 | 8 | 4.92 | 3 | | |
| 4.70 | 37 | 4.70 | 18 | 4.73 | 48 |
| | | 4.61 | 5 | | |
| 4.38 | 16 | 4.37 | 15 | 4.41 | 10 |
| | | 4.11 | 5 | | |
| 3.94 | 10 | 3.95 | 13 | 3.96 | 12 |
| 3.79 | 100 | 3.80 | 63 | 3.81 | 95 |
| 3.71 | 32 | 3.71 | 18 | 3.72 | 36 |
| 3.62 | 24 | 3.62 | 25 | 3.64 | 26 |
| 3.52 | 82 | 3.52 | 55 | 3.53 | 86 |
| 3.44 | 20 | 3.44 | 15 | 3.45 | 24 |
| | | | | 3.28 | 5 |
| 3.15 | 58 | 3.15 | 55 | 3.16 | 67 |
| 3.08 | 26 | 3.09 | 25 | 3.10 | 33 |
| 3.03 | 24 | 3.04 | 20 | 3.05 | 28 |
| 2.98 | 24 | 2.98 | 23 | 3.00 | 21 |
| 2.92 | 66 | 2.92 | 63 | 2.92 | 74 |
| 2.83 | 4 | 2.83 | 4 | 2.84 | 3 |
| 2.65 | 7 | 2.65 | 14 | 2.66 | 10 |
| 2.63 | 10 | 2.625 | 9 | 2.63 | 9 |
| | | 2.55 | 2 | 2.56 | 3 |
| 2.53 | 11 | 2.52 | 8 | 2.53 | 9 |
| 2.49 | 4 | 2.48 | 3 | 2.49 | 4 |
| 2.43 | 2 | 2.43 | 2 | 2.43 | 3 |
| | | 2.40 | 2 | 2.40 | 4 |
| 2.38 | 10 | 2.375 | 6 | 2.38 | 7 |
| 2.27 | 10 | 2.275 | 10 | 2.29 | 7 |
| | | | | 2.27 | 3 |
| 2.20 | 3 | 2.20 | 1 | 2.205 | 4 |
| | | 2.16 | 2 | 2.17 | 5 |
| | | 2.14 | 4 | 2.14 | 7 |
| 2.10 | 4 | 2.10 | 3 | 2.11 | 5 |
| | | 2.08 | 1 | 2.09 | 3 |
| | | 2.03 | 1 | 2.04 | 5 |
| | | 2.015 | 2 | 2.02 | 1 |
| 1.98 | 6 | 1.985 | 6 | 1.99 | 9 |

Table 2

| | Broad | Preferred |
|---|---|---|
| $\dfrac{Na_2O}{R_2O + Na_2O}$ | .31 to 1 | .75 to .99 |
| $\dfrac{R_2O + Na_2O}{YO_2}$ | .05 to .90 | .15 to .75 |
| $\dfrac{YO_2}{W_2O_3}$ | 3 to 60 | 6 to 30 |
| $\dfrac{H_2O}{R_2O + Na_2O}$ | 15 to 600 | 20 to 150 | wherein R is a tetramethylammonium cation, W is aluminum or gallium and Y is silicon or germanium, and maintaining the mixture until crystals of the zeolite are formed. Thereafter, the crystals are separated from the liquid and recovered. ZSM-4 is preferably formed as an aluminosilicate. The composition can be prepared utilizing materials which supply the appropriate oxide. Such compositions include for an aluminosilicate, sodium aluminate sodium silicate, silica hydrosol, silica gel, silicic acid, sodium hydroxide and tetramethylammonium hydroxide. It will be understood that each oxide component utilized in the reaction mixture for preparing a member of the ZSM-4 family can be supplied by one or more initial reactants. For example, sodium oxide can be supplied by an aqueous solution of sodium hydroxide, or by an aqueous solution of sodium silicate. The reaction mixture can be prepared either batchwise or continuously. Crystal size and crystallization time of the ZSM-4 composition will vary with the nature of the reaction mixture employed.

Zeolite ZSM-4 can be suitably prepared by preparing a solution containing $R_2O$, sodium oxide, an oxide of aluminum or gallium, an oxide of silica or germanium, and water and having a composition, in terms of mole ratios of oxides, falling within the following ranges:

One method of preparing this new zeolitic material comprises forming an aqueous solution of the reactant mixture which solution is designated for convenience as a crystallization directing agent, or CDA, which contains sodium oxide, alumina, silica, and water. Use of this crystallization directing agent has been found to lead to better yields of ZSM-4 crystals and greater reproducibility. The CDA mixture or agent can have a composition, in terms of mole ratios of oxides, within the following ranges:

Table 3

|  | Broad | Preferred | Most Preferred |
|---|---|---|---|
| $\frac{Na_2O}{SiO_2}$ | 1 to 4 | 1.5 to 3 | 1.85 |
| $\frac{SiO_2}{Al_2O_3}$ | 2 to 40 | 7 to 20 | 16 |
| $\frac{H_2O}{Na_2O}$ | 10 to 60 | 15 to 25 | 18 |

The crystallization directing agent mixture, is aged for a period of time of about 0.2 to 4 hours, preferably 0.5 to 2 hours, at 40° to 70°C., preferably 60°C., and mixed into a second solution containing sodium oxide, silica, and water. A third solution containing alumina and water is added to the resultant solution with stirring thereby forming a slurry. The amounts of sodium oxide, silica, alumina and water in these later solutions are such that when added to the CDA, the amounts of the various ingredients fall within the broad range of Table 2. The slurry is heated for a short period of time at about 100°C., say, between about 0.5 and 1 hour, and the resultant product is filtered. The resulting filter cake comprises an amorphous material which is mixied in its wet state with solution, e.g. an aqueous solution, of tetramethylammonium hydroxide, preferably a somewhat dilute solution of about 5 to 25% concentration, weight basis. After thorough mixing, the last-described mixture, which is in the form of a slurry, is heated over a period of time to produce a crystalline product. It is generally heated at a temperature of about 100°C. for between about 1 and 3 days. The product is then filtered, washed until the washings show a pH below 11, and dried at 100°-110°C, for several hours.

When preparing the ZSM-4 catalyst, it is preferred to mix the various solutions employed in a mixing nozzle so as to effect maximum contact of the respective ingredients together. This contact in a mixing nozzle precedes heating of any resultant solution and crystallization of the aluminosilicate. This method is preferred whether or not a CDA is utilized and whether or not the tetramethylammonium compound is introduced directly into the solution or passed over the wet filter cake as discussed above. Less tetramethylammonium oxide is required to prepare ZSM-4 crystals by first preparing a wet filter cake than by the solution method normally utilized, provided sodium hydroxide is included in the tetramethylammonium ion solution to balance the electronegative charge of the aluminosilicate tetrahedra. However, as the ratio of tetramethylammonium ions to sodium ions in the solution passed over the filter cake increases, the time of crystallization increases. Thus, if the time for crystallization of the ZSM-4 crystals is not critical; one can prepare ZSM-4 crystals employing a fraction of the amount of tetramethylammonium oxide employed in the solution method and compensating the electronegative charge of the aluminosilicate tetrahedra by increasing the sodium ion content in the solution passed over the wet filter cake proportionately.

Members of the ZSM-4 family, can be base exchanged to remove the sodium cations by such ions as hydrogen (from acids), ammonium, and alkylammonium and arylammonium includinig $RNH_3$, $R_3NH+$, $R_2NH_2+$ and $R_4N+$ where R is alkyl or aryl, provided that steric hindrance does not prevent the cations from entering the cage, and cavity structure of the ZSM-4 aluminosilicate composition. The hydrogen form of ZSM-4, useful in such hydrocarbon conversion processes as isomerization of poly-substituted alkyl aromatics and disproportionation of alkyl aromatics, is prepared, for example, by base exchanging the sodium form with, say, ammonium chloride or hydroxide whereby the ammonium ion is substituted for the sodium ion. The composition is then calcined at a temperature of, say, 1000°F. causing evolution of ammonia and retention of a proton in the composition. Other replacing cations include cations of the metals of the Periodic Table, especially metals other than sodium, especially metals of Group II, e.g. zinc and Group VIII of the Periodic Table and rare earth metals and manganese.

The above crystalline zeolite especially in its metal, hydrogen, ammonium, alkylammonium and arylammonium forms can be beneficially converted to another form by thermal treatment. This thermal treatment is generally performed by heating one of these forms at a temperature of at least 700°F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1600°F. at which temperature some decomposition begins to occur. The thermally treated product is particularly useful in the catalysis of certain hydrocarbon conversion reactions.

Regardless of the cations replacing the sodium in the synthesized form of the ZSM-4, the spatial arrangement of the aluminum, silicon and oxygen atoms which form the basic crystal lattice of ZSM-4, remains essentially unchanged by the described replacement of sodium or other alkali metal as determined by taking an X-ray powder diffraction pattern of the ion-exchanged material. Such X-ray diffraction pattern of the ion-exchanged ZSM-4 reveals a pattern substantially the same as that set forth in Table 1 above.

Ion exchange of the zeolite can be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in as synthesized ZSM-4. This commercially available rare earth chloride solution contains chlorides of rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides, but having a lower cerium content. It consists of the following rare earths determined as oxides: lanthanum 45–65% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred.

Base exchange with various metallic and non-metallic cations can be carried out according to the procedure described in U.S. Pat. No. 3,140,251, 3,140,252 and 3,140,253.

The ZSM-4 zeolites are formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the zeolite can be extruded before drying or dried or partially dried and then extruded.

In the case of many catalysts, it is desired to incorporate the ZSM-4 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-4, i.e. combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g. bentonite and kaolin, to improve the crush strength of the catalyst under commercial operating conditions. These materials, i.e. clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally occurring clays which can be composited with the ZSM-4 catalyst include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. One way to render the clay suitable for use is to treat them with sodium or potassium hydroxide, and calcine at temperatures ranging from 230°F. to 1600°F. thereby preparing a porous crystalline zeolite. Binders useful for compositing with the ZSM-4 catalyst also include inorganic oxides, notably alumina.

In addition to the foregoing materials, the ZSM-4 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline zeolite ZSM-4 and inorganic oxide gel matrix vary widely with the zeolite content ranging from about 1 to about 90 percent by weight and more usually, particularly when the composite is prepared in the form of beads, in the range of about 2 to about 50 percent by weight of the composite.

Catalytically active members of the family of zeolites designated as ZSM-4 possess a property of selectivity which distinguishes them from all known zeolites. Selectivity is measured as the ratio of o-xylene isomerized to that disproportionated. Selectivity designates the weight ratio of o-xylene isomerized to o-xylene disproportionated employing 200 ml of o-xylene which has been percolated with activated alumina at 2 volumes per volume per hour at room temperature and introduced into a 1 liter steel shaker bomb containing 3.0 grams of zeolite which has been calcined, weighed out and after being weighed, dried at 900°F. for ½ hour, said bomb having been purged with nitrogen. The bomb is heated to 400°F. rapidly using an induction furnace while shaking at 200 RPM using an electric driven single cylinder Lawson engine for shaking the bomb. The o-xylene is converted to conversion products, the bomb is water quenched, the shaking discontinued and the liquid sample analyzed. A complete description of apparatus to be used in determining the selectivity is disclosed in an article entitled "A New Laboratory Tool for Studying Thermal Processes" by J. W. Payne, C.W. Streed and E.R. Kent appearing in *Industrial and Engineering Chemistry*, Volume 50, pages 47–52 (1958). Such "selectivity" distinguishes ZSM-4 from other crystalline zeolites inasmuch as members of the ZSM-4 family are uniquely characterized by a greater selectivity than other known zeolite catalysts.

In the reaction of ortho xylene over an acidic catalyst there are two major competing hydrocarbon conversion reactions taking place, i.e. isomerization and disproportionation. The isomerization tends first to form meta xylene, and thence to proceed to para xylene. On the other hand, the disproportionation reaction tends to form a mixture of methyl benzenes, primarily toluene and trimethyl benzenes. Thus, a suitable isomerization catalyst should be one which provides the desired xylene isomers in good quantities relative to the amounts of disproportionated products obtained. The HZSM-4 catalyst has been found to provide a ratio of isomerization products to disproportionation products of at least 4 while other zeolite catalysts under the same reaction conditions were unable to achieve such high ratio. These include rare earth exchanged Linde Zeolite Y catalyst, rate earth exchanged Linde Zeolite X catalyst, HY, rare earth HY and hydrogen mordenite. As an example, the hydrogen form ZSM-4 is between 5 and 10 times more selective than a rare earth exchanged Linde zeolite X aluminosilicate for ortho-xylene isomerization. Additionally, this isomerization can be performed without impregnation into or onto the catalyst of a noble metal, such as platinum, and without employing hydrogen to assist in the isomerization. The fact that hydrogen can be dispensed with when employing the HZSM-4 catalyst for aromatic isomerization is particularly significant since the presence of hydrogen in an aromatic isomerization system, in addition to being expensive, tends to cause some saturation of the aromatic ring which results in subsequent cracking to undesired by-products. The HZSM-4 catalyst provides a high selectivity at various silica-alumina mole ratios such as 5.8/1; 7/1 and 13/1.

The isomerization of alkyl aromatic hydrocarbons may be carried out at temperatures between 250°F and 1000°F and at pressures ranging from ambient pressures or less up to about 2000 p.s.i.g. In general, the isomerization reaction will be carried out at temperatures ranging from 350°F to 650°F. Within these limits the conditions of temperature and pressure will vary considerably depending upon equilibrium considerations and type of feed material. Optimum conditions are those in which maximum yields of desired isomer products are obtained and hence considerations of temperature and pressure will vary within a range of conversion levels designed to provide the highest selectivity and maximum yield.

Due to the unusual selectivity and activity of ZSM-4 catalyst, it has been found that controlled isomerization reactions can be achieved at temperatures below about 600°F in a liquid phase operation using sufficient pressure to maintain the charge material in liquid phase. The liquid phase operation is especially advantageous since high levels of activity and selectivity can be maintained for extended periods of time.

The isomerization reaction can be carried out over a wide range of liquid hourly space velocities (LHSV) within the range of 0.05 to 40. In the preferred operation the space velocity will be within the range of 0.25 to 10 since the conversion generally decreases with an increase in space velocity although selectivity is usually increased.

The present invention may be more clearly understood by reference to the drawings in which.

In the drawings, "Px" and "P-X" refer to para-Xylene "Mx" refers to meta-Xylene, "Ox" refers to ortho-Xylene, "EB" refers to ethylbenzene, "$C_{9+}$" refers to aromatic fractions having alkyl side chains attached thereto and having an aggregate of at least nine carbons atoms in the molecule, and "LTI" refers to "Low Temperature Isomerization".

Figure 1:
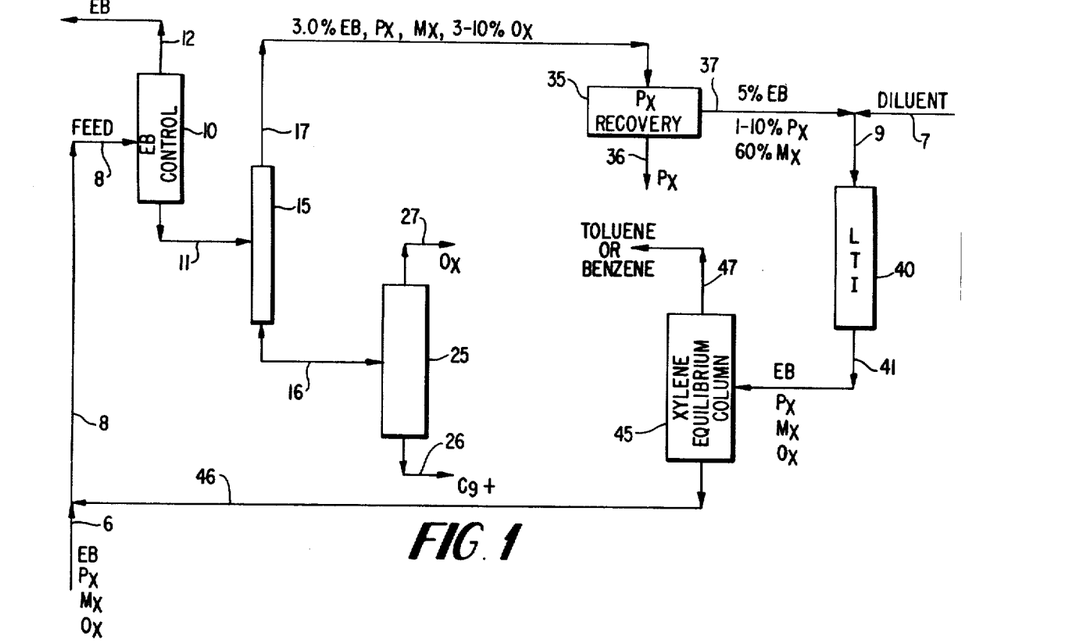
FIG. 1 is a flow diagram for one embodiment of the isomerization process of this invention using a diluent.

Referring to FIG. 1, a mixture of xylene isomers enters the process as isomerization feedstock 6, mixes with recycled ethylbenzene-mixed xylene mixture 46, forming preliminary feed stream 8. The combined feedstock 8 enters the ethylbenzene separator 10. The bottom product 11, having a controllable ethylbenzene content, leaves separator 10 and is additionally fractionated in distillation column 15 into bottom stream 16 and overhead stream 17. The top stream 12 from the separator 10 contains the excess ethylbenzene, which leaves the process.

Bottom stream 16 is separated in fractionation unit 25 into a $C_{9+}$ bottom fraction 26 which leaves the process and an ortho-Xylene top fraction 27 which leaves the process. Overhead stream 17 is the feed stream for para-Xylene recovery unit 35.

The para-Xylene recovery unit 35 isolates the para-Xylene product stream 36, which leaves the process, and a meta-Xylene-rich by-product stream 37 which then mixes with diluent 7, if needed, to form combined feedstock 9 which becomes feed material for a low-temperature isomerizer 40. The diluent 7 entering the process is an aromatic compound as defined above. The isomerized product 41 enters the xylene equilibrium column 45 from which overhead diluent stream 47 and bottom stream 46 emerge. Stream 47 leaves the process and may toluene or benzene, if present, and stream 46 contains ethylbenzene, para-Xylene, meta-Xylene, and ortho-Xylene which is recycled to mix with isomerization feedstock 6, as described hereinbefore.

Figure 2:
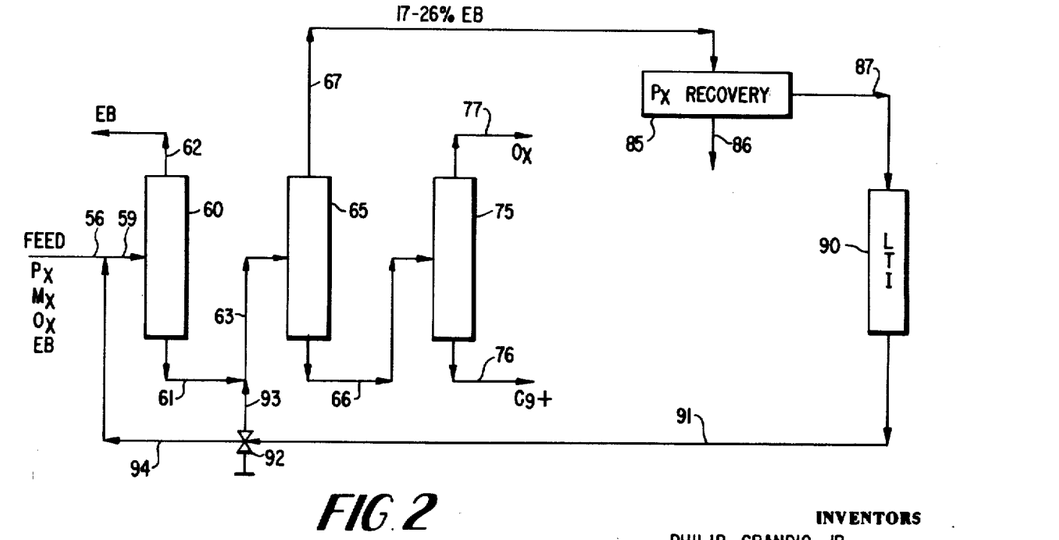
FIG. 2 is a flow diagram for an alternative embodiment when ethylbenzene is used as a diluent.

Referring to FIG. 2, which shows an alternative process for use when ethylbenzene is a diluent rather than toluene, feed 56 is a mixture of ethylbenzene, para-, meta-, and ortho-Xylenes and is mixed with recycle stream 94 to form combined feedstock 59 for ethylbenzene separator 60. Top stream 62 from separator 60 is excess ethylbenzene which leaves the process.

Bottom stream 61 from separator 60 selectively mixes with alternate recycle stream 93 to form combined xylene feedstock 63 for distillation column 65. Alternate recycle stream 93 is selectively sent to column 65, in a partial or complete bypass of column 60, by selector valve 92 whenever the total ethylbenzene content is recycle stream 91 and feed stream 56 is no greater than desired.

Bottom stream 66 from column 65 enters distillation unit 75 where it is separated into bottom stream 76 containing $C_{9+}$ compounds, which leave the process, and overhead stream 77 containing ortho-Xylene, which leaves the process.

Overhead stream 67 from column 65, containing 17–26% ethylbenzene, is feed for the para-Xylene recovery unit 85. Product stream 86 from recovery unit 85, containing pure para-Xylene, leaves the process. By-product stream 87 from recovery unit 85 enters the low temperature isomerizer 90. The isomerized product 91 is alternately routed, partially or entirely, by selector valve 92 into feed streams 93 and 94.

Figure 3:
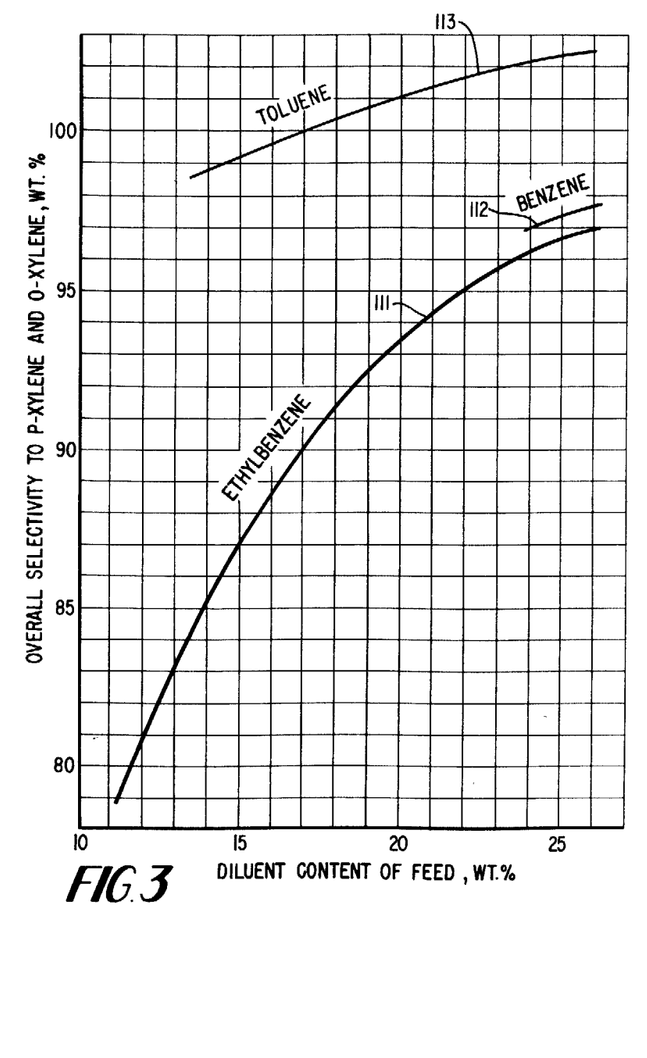
FIG. 3 shows the overall isomerization selectivity toward o-Xylene and p-Xylene when the feed material is diluted with toluene in the presence of a smaller amount of ethylenebenzene.

Curves 111, 112, and 113 for ethylbenzene, benzene, and toluene, respectively, in FIG. 3 show the overall selectivity to p-Xylene and o-Xylene at 95% of p-Xylene equilibrium in a low-temperature xylene isomerization as the diluent content of the feed is increased from 11% to 26% of the feed as a weight percentage.

These curves in FIG. 3 demonstrate the remarkable selectivity achieved by the isomerization process of this invention for xylene mixtures which are diluted with a singly alkylated aromatic hydrocarbon of 1 or 2 carbon atoms. Selectivities greater than 100% are caused by a slight amount of disproportionation of diluent into the desirable isomers, ortho-Xylene and para-Xylene, without attendant wasteful disproportionation or transalkylation of the xylene isomers or of the diluents. The catalyst was prepared as in Example 1 and contained 0.4 weight percent sodium.

Figure 4:
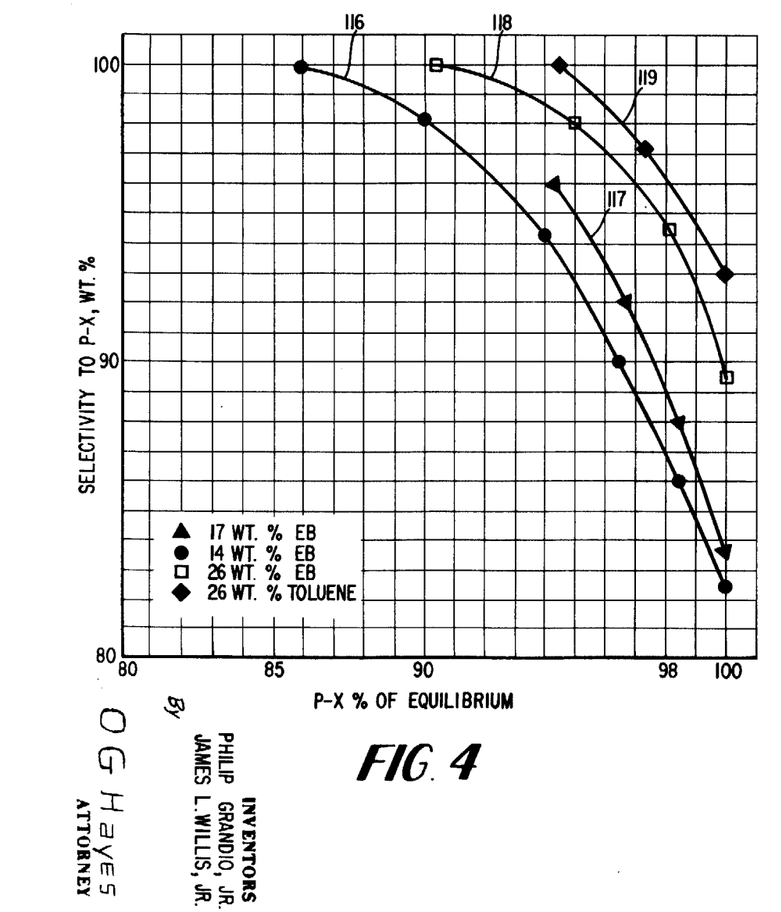
FIG. 4 shows the relationship between para-Xylene approach to equilibrium and the selectivity to para Xylene at three levels of ethylbenzene and one level of toluene as diluents in the isomerization process of this invention.

Referring to FIG. 4, curves 116, 117, and 118 refer to xylene isomerization tests in which ethylbenzene was the diluent in the same xylene isomer feedstock at levels of 14%, 17%, and 26% by weight over a 1/53-inch crushed catalyst containing 0.2% by weight of sodium prepared as in Example 1. Curve 119 represents test results over the same catalyst in which toluene was the diluent at 26% by weight in the same xylene isomer feedstock.

FIG. 4 shows isomerization effects which have been found to be real over a wide range of operation. At a fixed isomerization level of 98.0% by weight of para-Xylene equilibrium, the para-Xylene selectivity increased from 87.8 to 94.0 wt.% when ethylbenzene as diluent increased from 14.0 to 26.0 wt.%. The curves in FIG. 4 also show that at the same diluent concentration level, 26% by weight, the para-Xylene selectivity increased from 94.0 to 96.4 wt.% when toluene replaced ethylbenzene as diluent.

The superior diluent performance of toluene as compared to ethylbenzene shows that toluene is a better disproportionation inhibitor which is attributed to the fact that disproportionation of a methyl group requires greater severity than disproportionation of an ethyl group. Consequently, the use of toluene as diluent instead of ethylbenzene significantly reduces the quantities of benzene and of $C_{9+}$ aromatics which are produced during low temperature isomerizations according to the process of this invention.

In the examples, the effect of a diluent upon xylene isomer disproportionation is measured by the following criteria, as defined by equations:

1. Percent of Equilibrium, wt.% = $\frac{(pX)_p/X_p}{0.234^*} \times 100$

2. Xylene Loss, wt.% = $\frac{X_f - X_p}{X_f} \times 100$

3. Conversion to $pX$ wt.% = $\frac{(mX + oX)_f - (mX + oX)_p}{(mX + oX)_f} \times 100$ 4. Selectivity to $pX$ wt.% = $\frac{(pX)_p - (pX)_f}{(mX + oX)_f - (mX + oX)_p} \times 100$ 5. Yield to $pX$ wt.% = $\frac{(pX)_p + (pX)_f}{(mX + oX)_f} \times 100$ 6. Overall Selectivity to both $pX$ and $oX$ wt.% =

$\frac{[(pX)_p - (pX)_f]}{(mX)_f - (mX)_p} \cdot 100 + \frac{[(oX)_p - (oX)_f]}{(mX)_f - (mX)_p} \cdot 100$

*0.234 is the equilibrium value for p-Xylene in a mixture of the three xylene isomers.

The terms in the equations are defined as follows:

$(pX)_f$ = p-Xylene content in feed, wt.%
$(pX)_p$ = p-Xylene content in product, wt.%
$X_f$ = Total xylene content in feed, wt.%
$X_p$ = Total xylene content in product, wt.%
$(mX + oX)_f$ = m- and o-Xylene contents in feed, wt.%
$(mX + oX)_p$ = m- and o-Xylene contents in product, wt.%

All tests were made at 200 psig and at a temperature sufficient to maintain the equilibrium percentage for p-Xylene between 97 and 99. All data are on a weight percentage basis.

EXAMPLE 1

A CDA solution was formed by dissolving 173.70 grams of 97.4 percent sodium hydroxide in 688.80 grams water and adding thereto 21.60 grams of sodium aluminate and 309.60 grams sodium silicate. Into a Waring Blender of one gallon capacity was introduced a sodium silicate aqueous solution containing 1215.00 grams sodium silicate. The powerstat on the Waring Blender was turned on at a low speed of about 65 percent capacity and to the sodium silicate solution was added the CDA solution. After the CDA solution was added, an alum solution containing 213.78 grams $Al_2(SO_4)_3 \cdot 14\ H_2O$, 248.40 grams 96.5 percent $H_2SO_4$ and 1080.00 grams $H_2O$ was added. This caused the mixture in the Waring Blender to thicken. Mixing continued with the aid of a spatula. When the mixture was mixed thoroughly, 325.80 grams of a 25 percent aqueous solution of tetramethylammonium hydroxide was added until a smooth paste was formed. The product was poured into two 2-quart jars, sealed and placed in a 100°C. steam box. A product crystallized after 34 days. It was a ZSM-4 composition having a silica:alumina mole ratio of 13:1 and the characteristic X-ray diffraction pattern of ZSM-4 as set forth in Table 1 above.

The crystals were base exchanged with 20 wt.% ammonium sulfate solution, washed free of sulfate, dried at 230°F. and thereafter calcined to convert the ammonium form into the hydrogen form of ZSM-4. The product analyzed 0.34 wt.% sodium.

EXAMPLE 2

A CDA solution was formed by dissolving 169.8 grams of 97.3 percent sodium hydroxide in 673.2 grams water and adding thereto 21.1 grams of sodium aluminate and 302.7 grams sodium silicate. Into a Waring Blender of one gallon capacity was introduced a 37.3 percent sodium silicate aqueous solution containing 1188.0 grams sodium silicate. The powerstat on the Waring Blender was turned on at a low speed of about 65 percent capacity and to the sodium silicate solution was added the CDA solution. After the CDA solution was added, an alum solution containing 209.0 grams $Al_2(SO_4)_3 \cdot 14\ H_2O$, 176.0 grams 96.5 percent $H_2SO_4$ and 960 grams $H_2O$ was added. This caused the mixture in the Waring Blender to thicken. Mixing continued with the aid of a spatula. When the mixture was mixed thoroughly, 665.5 grams of a 24 percent aqueous solution of tetramethylammonium hydroxide was added until a smooth paste was formed. The contents were placed in a bottle and heated to 100°C. After 30 hours a product crystallized. It was a ZSM-4 composition having a silica: alumina mole ratio of 7.7:1 and the characteristic X-ray diffraction pattern of ZSM-4 as set forth in Table 1 above.

The crystals were base exchanged with ammonium chloride, washed free of chloride, dried at 230°F. and thereafter calcined at 1000°F. to convert the ammonium form of ZSM-4 into the hydrogen form. The product analyzed 0.21 wt.% sodium.

EXAMPLE 3

After the catalyst of Example 2 had been used for isomerizing mixtures of xylene isomers for 50 days, it was employed for catalyzing the isomerization of a xylene isomer feedstock containing 10.4% p-Xylene, 53.4% m-Xylene, and 9.8% o-Xylene while diluted with 25.8% benzene and 0.3% ethylbenzene, at a temperature of 445°F. and a weight-hourly space velocity of 2.8 lbs. oil/hr-lb. catalyst.

The isomerized xylene product contained 16.8% p-Xylene, 40.8% m-Xylene, and 15.8% o-Xylene. The results are set forth in Table 4.

EXAMPLE 4

The same catalyst of Example 2 after 62 days of use in isomerization of xylenes, was employed for isomerizing a feedstock containing 10.7% p-Xylene, 52.4m-Xylene, and 10.1% o-Xylene, with a diluent of 1.1% toluene and 25.7% ethylbenzene, at 445°F. and 2.8 lb oil/hr-lb catalyst. The results are shown in Table 4.

EXAMPLE 5

The catalyst used in Example 2, after 71 days of isomerizing xylenes, was employed for isomerizing a xylene isomer feedstock containing 11.0% p-Xylene, 52.6% m-Xylene, and 10.3% o-Xylene with a diluent of 25.7% toluene and 0.4% ethylbenzene at 445°F. and 2.8 lb oil/hr-lb catalyst. The product contained 16.8% of p-Xylene. The results are given in Table 4.

Effect of Sodium Content of Catalyst

To provide a comparison of a catalyst containing 0.2 weight percent sodium with a catalyst containing 0.4 weight percent sodium, the degree of isomerization, catalyst age, dilution and particle size were fixed at 98.0% p-Xylene equilibrium, 26–36 days on stream, 26% ethylbenzene diluent and 1/53-inch, respectively; comparison showed that selectivity to p-Xylene was increased from 89.0% to 93.4% by weight, with the higher selectivity corresponding to the higher sodium content, while xylene losses decreased from 1.2% to 0.7% by weight.

Effect of Diluent and Diluent Level

As shown in FIG. 3, increasing amounts of ethylbenzene as a diluent for a xylene isomer feedstock impart increased selectivity to p-Xylene at a constant percentage of p-Xylene equilibrium. In general, both selectivity to p-Xylene and the approach of p-Xylene to equilibrium in the product show an increase with increasing ethylbenzene content as feedstock diluent is increased over the range of 14% to 26% by weight.

FIG. 3 also shows that selectivity to p-Xylene increases steadily and at substantially equal rates as the diluent level increases for both toluene and ethylbenzene. Toluene is evidently much more effective than ethylbenzene. Toluene shows an increase above 100% because it is itself disproportionated slightly to form xylene products, a portion of which is p-Xylene, and benzene.

In contrast, any slight disproportionation of ethylbenzene tends to produce some ethyl-methyl $C_9$ aromatics. If no ethylbenzene, toluene, or benzene is present as a diluent, very poor p-Xylene yield results, as shown below in Example 6 for ethylbenzene.

EXAMPLE 6

A catalyst prepared according to Example 2 (containing 0.4% by weight of sodium) was regenerated after 194 days of xylene isomerization and contacted for two days with a xylene feedstock at 480°F., 2.8 lbs oil/hr-lb catalyst, and 200 psig. The diluent was ethylbenzene at a concentration of 2.9% by weight in order to test the effect of lower levels of diluent. During this period of operation, the degree of isomerization decreased from 97.5% to 64% of p-Xylene equilibrium, and the selectivity to p-Xylene decreased from 94.6% to 70.6% by weight.

EXAMPLE 7

A feed mixture of 80% pseudocumene (1, 2, 4-trimethylbenzene) and 20% o-xylene was passed at 600°F. and 1/1 LHSV over a catalyst as prepared in accordance with Example 2 which had been partially inactivated by two previous experimental runs. The results are shown in Table 5.

EXAMPLE 8

The feed mixture of Example 7 was passed over the same catalyst at 550°F. and 1/1 LHSV. The results, shown in Table 5 demonstrate that lower temperature are preferable and indicate that at optimum temperature very little trimethylbenzene is likely to be lost.

EXAMPLE 9

Using a 2cc reactor, a feed mixture of 25 weight percent o-xylene and 75 weight percent pseudocumene (1, 2, 4-trimethylbenzene) was passed continuously over the catalyst prepared in Example 2 at 400°F. and 600 psig and at a feed rate of 1/1 LHSV for five days. During this time, numerous samples were analyzed with a gas chromatograph. The product analysis, taken at 99% of equilibrium, is shown in Table 5.

The 1% drop in total trimethylbenzenes indicates that the reactor temperature was still slightly too high. It was estimated that a further drop to 385°F. would probably result in 100% recovery of the trimethylbenzenes with very little loss in conversion to mestiylene.

EXAMPLE 10

Using the 2cc reactor with fresh catalyst, as prepared in Example 2, a feed consisting of 100% pseudocumene was similarly isomerized continuously at 400°F., 600 psig, and a flow rate of 1/1 LHSV according to gas chromatographic computer analysis. The product at 99% of equilibrium, as listed in Table 5, shows that about 15 weight percent of trimethylbenzene was lost because of disproportionation to $C_8$ and $C_{10}$.

Additional attempts were made to isomerize pseudocumene without adding xylenes and at temperatures less than 400°F. It was found that mesitylene was produced in smaller quantities while larger recoveries of trimethylbenzene were obtained. It appeared impossible to isomerize pseudocumene without appreciable disproportionation to $C_8$ and $C_{10}$ compounds unless xylenes were added. A mixture of xylenes was also found to be as satisfactory as a single xylene isomer. Addition of toluene as the diluent instead of xylene resulted in the formation of large amounts of xylenes from transalkylation.

lene feed mixture, of ethylbenzene and a crystalline zeolite composition having a composition, in terms of mole ratios of oxides, as follows:

$0.9\pm0.2$ M$_2$O/n: W$_2$O$_3$ : 3-20 YO$_2$ : z H$_2$O wherein M

TABLE 4

Effect of Aromatic Diluents on LTI Performance

| EXAMPLE NUMBER | 4 | | 5 | | 3 | |
|---|---|---|---|---|---|---|
| Diluent | ETHYLBENZENE | | TOLUENE | | BENZENE | |
| Reaction Conditions | | | | | | |
| Temperature, °F | 445 | | 445 | | 445 | |
| Weight-Hourly Space Velocity, lb. oil/hr. -lb. catalyst | 2.8 | | 2.8 | | 2.8 | |
| Time on Stream, days | 62 | | 71 | | 50 | |
| Diluent Composition, Wt % | Feed | Product | Feed | Product | Feed | Product |
| Benzene | 0 | 0.6 | 0 | 0.1 | 25.8 | 25.3 |
| Toluene | 1.1 | 1.7 | 25.7 | 25.5 | 0 | 1.0 |
| Ethylbenzene | 25.7 | 24.6 | 0.4 | 0.4 | 0.3 | 0.3 |
| Xylene Isomer Feedstock, Wt % | Feed | Product | Feed | Product | Feed | Product |
| p-Xylene | 10.7 | 16.6 | 11.0 | 16.9 | 10.4 | 16.8 |
| m-Xylene | 52.4 | 39.7 | 52.6 | 40.9 | 53.7 | 40.8 |
| o-Xylene | 10.1 | 15.6 | 10.3 | 16.1 | 9.8 | 15.8 |
| Total Xylene | 73.2 | 71.9 | 73.9 | 73.9 | 73.9 | 73.4 |
| C$_9$+ | 0 | 1.2 | 0 | 0.1 | 0 | 0.03 |
| Xylene Losses, wt % | | 1.8 | | 0 | | 0.7 |
| p-Xylene, % of Equilibrium | | 98.7 | | 97.7 | | 97.8 |
| Conversion, wt % (Original Basis) | | 11.5 | | 9.4 | | 10.9 |
| Selectivity to p-Xylene, wt % | | 81.9 | | 100.0 | | 92.8 |
| p-Xylene Yield, wt % | | 9.4 | | 9.4 | | 10.1 |

TABLE 5

| Ex. | <C$_6$ | Benzene | Toluene | Ethyl-benzene | Xylenes | | | | Trimethylbenzenes | | | | C$_{10}$ |
|---|---|---|---|---|---|---|---|---|---|---|---|---|---|
| | | | | | o | m | p | Total | 1,2,3 | 1,2,4 | 1,3,5 | Total | |
| 7 | 0.38 | 0.20 | 3.95 | 0.02 | 5.83 | 13.00 | 5.32 | 24.2 | 20.2 | 42.2 | 20.2 | 70.9 | 0.4 |
| 8 | 0.19 | 0.27 | 2.60 | <0.01 | 8.08 | 8.80 | 2.66 | 19.5 | 6.6 | 54.6 | 16.1 | 77.3 | 0.1 |
| 9 | — | — | 0.7 | — | — | — | — | 24.4 | — | — | — | 74.2 | 0.6 |
| 10 | — | — | 0.3 | — | — | — | — | 6.1 | —. | — | — | 86.7 | 7.0 |

What is claimed is:

1. A process for effecting catalytic isomerization of a xylene mixture which comprises contacting said mixture in the liquid phase in the absence of added hydrogen at a temperature within the range of 350°F. to 650°F. at a pressure of up to about 2000 psig. at a liquid hourly space velocity within the range of 0.05 to 40 in the presence of 5 to 30 weight percent, based on the xylene feed mixture, of ethylbenzene and a crystalline zeolite composition having a composition, in terms of mole ratios of oxides, as follows:

is a cation, n is the valence of said cation, W is aluminum and Y is silicon; and z is between 0 and 20.

2. The process of claim 1 wherein M is selected from the group consisting of alkylammonium and arylammonium, metals, ammonium and hydrogen.

3. The process of claim 1 wherein the zeolite has been subjected to thermal treatment.

* * * * *